US011837968B2

(12) United States Patent
Chen

(10) Patent No.: US 11,837,968 B2
(45) Date of Patent: Dec. 5, 2023

(54) APPARATUS AND METHOD FOR PERSISTENT DC POWER PANEL CONVERSION

(71) Applicant: Entrantech Inc., Gilroy, CA (US)

(72) Inventor: Kong-Chen Chen, Gilroy, CA (US)

(73) Assignee: Entrantech Inc., Gilroy, CA (US)

(*) Notice: Subject to any disclaimer, the term of this patent is extended or adjusted under 35 U.S.C. 154(b) by 0 days.

(21) Appl. No.: 17/402,435

(22) Filed: Aug. 13, 2021

(65) Prior Publication Data

US 2022/0052619 A1 Feb. 17, 2022

Related U.S. Application Data

(60) Provisional application No. 63/065,341, filed on Aug. 13, 2020.

(51) Int. Cl.
| | | |
|---|---|---|
| *H02M 7/217* | (2006.01) | |
| *H02J 1/00* | (2006.01) | |
| *H02M 3/155* | (2006.01) | |

(52) U.S. Cl.
CPC .......... *H02M 7/217* (2013.01); *H02J 1/00* (2013.01); *H02M 3/155* (2013.01)

(58) Field of Classification Search
CPC ........ H02M 7/217; H02M 3/155; H02M 1/10; H02J 1/00; H02J 2310/12; H02J 1/086; H02J 4/00
See application file for complete search history.

(56) References Cited

U.S. PATENT DOCUMENTS

| | | | |
|---|---|---|---|
| 5,635,773 A | 6/1997 | Stuart | |
| 5,786,642 A * | 7/1998 | Wilhelm | H02J 9/061 307/64 |
| 6,320,359 B1 | 11/2001 | Nagaya et al. | |
| 6,798,666 B1 | 9/2004 | Alexander et al. | |
| 8,148,844 B2 * | 4/2012 | Pan | H02J 3/14 307/29 |
| 10,840,735 B1 * | 11/2020 | Cooper | H02J 13/00004 |
| 11,183,851 B1 | 11/2021 | Chen | |
| 11,476,657 B2 | 10/2022 | Chen | |
| 11,489,455 B2 | 11/2022 | Chen | |
| 11,605,970 B2 | 3/2023 | Chen | |
| 2004/0085043 A1 | 5/2004 | Germagian et al. | |

(Continued)

FOREIGN PATENT DOCUMENTS

WO  WO-2011035326 A1  3/2011

OTHER PUBLICATIONS

International Search Report & Written Opinion dated May 3, 2022 (ISA/US) in PCT Application PCT/US2021/059792.

(Continued)

*Primary Examiner* — John W Poos
*Assistant Examiner* — Tyler J Pereny
(74) *Attorney, Agent, or Firm* — Weaver Austin Villeneuve & Sampson LLP

(57) ABSTRACT

An apparatus converts an AC power panel into a persistent DC power panel with a persistent power switch. The persistent power switch includes a removable power unit for coupling to the AC power switch in order to convert the AC power panel into a persistent DC power panel. The removable power unit can be mounted in the power panel or can be implemented as a stand-alone external device for connecting to the power panel.

14 Claims, 9 Drawing Sheets

(56) References Cited

U.S. PATENT DOCUMENTS

| | | |
|---|---|---|
| 2005/0225955 A1 | 10/2005 | Grebenkemper et al. |
| 2005/0237724 A1 | 10/2005 | Fiorentino et al. |
| 2006/0244620 A1 | 11/2006 | Sotiriou |
| 2007/0073420 A1 | 3/2007 | Lanni |
| 2007/0273210 A1 | 11/2007 | Wang et al. |
| 2011/0053394 A1 | 3/2011 | Hood, III et al. |
| 2012/0118602 A1 | 5/2012 | Remmert |
| 2012/0188806 A1 | 7/2012 | Tamura et al. |
| 2012/0212078 A1 | 8/2012 | Lanni |
| 2013/0015714 A1 | 1/2013 | Kwok |
| 2015/0022001 A1 | 1/2015 | Goei et al. |
| 2015/0048767 A1 | 2/2015 | Takezawa |
| 2015/0054343 A1* | 2/2015 | Cui .................. H02J 7/02 307/66 |
| 2015/0348733 A1 | 12/2015 | Shi et al. |
| 2018/0212420 A1 | 7/2018 | Chen |
| 2018/0226797 A1 | 8/2018 | Galin et al. |
| 2019/0081571 A1 | 3/2019 | Chung et al. |
| 2019/0229546 A1* | 7/2019 | Hartl .................. H02J 9/062 |
| 2019/0288532 A1 | 9/2019 | Mattos et al. |
| 2020/0381917 A1 | 12/2020 | Takeda |
| 2022/0014014 A1 | 1/2022 | Chen |
| 2022/0052618 A1 | 2/2022 | Chen |
| 2022/0094191 A1 | 3/2022 | Suzuki et al. |
| 2022/0158482 A1 | 5/2022 | Chen |
| 2022/0190638 A1 | 6/2022 | Raju |
| 2022/0263427 A1 | 8/2022 | Willson et al. |
| 2022/0393488 A1 | 12/2022 | Chen |
| 2023/0050719 A1 | 2/2023 | Chen |

OTHER PUBLICATIONS

U.S. Corrected Notice of Allowance dated Oct. 6, 2022 in U.S. Appl. No. 17/398,355.
U.S. Corrected Notice of Allowance dated Sep. 20, 2022 in U.S. Appl. No. 16/950,882.
U.S. Notice of Allowance dated Jun. 9, 2022 in U.S. Appl. No. 16/950,882.
U.S. Appl. No. 17/402,450, inventor Chen K.C., filed Aug. 13, 2021.
U.S. Corrected Notice of Allowance dated Jul. 18, 2022 in U.S. Appl. No. 17/398,355.
U.S. Corrected Notice of Allowance dated Jun. 21, 2022 in U.S. Appl. No. 16/950,882.
U.S. Corrected Notice of Allowance dated Nov. 17, 2022 in U.S. Appl. No. 17/667,457.
U.S. Notice of Allowance dated Jul. 7, 2022 in U.S. Appl. No. 17/398,355.
U.S. Notice of Allowance dated Feb. 15, 2022 in U.S. Appl. No. 16/950,882.
U.S. Notice of Allowance dated Jul. 27, 2021 in U.S. Appl. No. 17/062,413.
U.S. Notice of Allowance dated Nov. 3, 2022 in U.S. Appl. No. 17/667,457.
International Preliminary Report on Patentability dated Jun. 1, 2023, in Application No. PCT/US2021/059792.
U.S. Corrected Notice of Allowance dated Feb. 14, 2023 in U.S. Appl. No. 17/667,457.
U.S. Notice of Allowance dated Apr. 19, 2023 in U.S. Appl. No. 17/884,984.
U.S. Notice of Allowance dated Jun. 7, 2023 in U.S. Appl. No. 17/402,450.
U.S. Notice of Allowance dated May 11, 2023 in U.S. Appl. No. 17/884,984.
U.S. Non-Final office Action dated Dec. 27, 2022 in U.S. Appl. No. 17/402,450.
U.S. Notice of Allowance dated Aug. 10, 2023 in U.S. Appl. No. 17/884,984.

* cited by examiner

APPARATUS AND METHOD FOR PERSISTENT DC POWER PANEL CONVERSION

CROSS REFERENCE TO RELATED APPLICATIONS

The Present application claims benefit under 35 USC 119(e) of Application Ser. No. 63/065,341, filed on Aug. 13, 2020, the content of which is incorporated herein by reference in its entirety.

FIELD OF THE INVENTION

The present invention relates to DC power panel, and more particularly, on the apparatus and method to convert an AC panel into a persistent DC power panel with a persistent power switch.

BACKGROUND

AC power prevails in most infrastructures, such as office, houses, or public facilities. AC power is distributed through AC circuit breakers installed in an AC power panel to power distribution circuits in a building for equipment or devices to access AC power.

There are many disadvantages in using AC power. It is more dangerous than DC. Almost all electronic devices today contain integrated circuits, which operate on DC power. Thus, users often require to carry power adaptors to convert AC power into DC for device to operate. The power adaptor is inconvenient to carry. The old power adaptors often become e-waste to deteriorate the green environments. A technology that could make DC power conveniently available in a physical infrastructure is useful.

Using DC power has additional advantages. A thinner insulation can be chosen for DC power delivery. DC power does not exert astray capacitance coupling. Higher current density can be transferred over the same copper wire in DC because of no Eddy current effect. AC power suffers more energy loss in power delivery due to the reactance in AC current. Obviously, to have DC power directly available for use in a physical infrastructure has more advantages than using AC.

Solar panels are getting popular on roof tops or around the premises of a building. However, the regenerated DC energies are often inverted into AC to immerge into a nearby AC power grid. The AC power that enters the utility grid will then re-enter the building, and through the power panel to distribute the re-entered AC to power distribution circuits, where power adaptor or power supply is used to convert the AC power back to DC for household electronics, such as computer, TV, or various hand-held devices to use. The inversion and conversion of regenerated DC energy are inefficient in power usage. A significant percentage of useable energy is wasted as heat in the conversion process.

A regenerated energy could be more effectively used, if the regenerated energy is directly entered to power panel in the building for use without going through the inversion and conversion process. Eventually, a highly energy efficient environment should not be AC-centric. It must be DC ubiquitous with equipment and electronic devices all operate on DC power in a physical infrastructure.

There is a common problem in using DC. The regenerated DC energy is not always available. For example, solar power is not generated at night, no wind power is produced when wind turbine stops spinning. Energy storage device, such as battery, is too expensive to install in large scale to be a feasible DC backup solution. When DC power is used in a building, the DC power must be consistently and constantly available, i.e. it must be a persistent power for DC to be a dominate power to replace AC in a physical infrastructure. A technique that can utilize the regenerated energy efficiently and provide DC power persistently in a cost-effective way without a need to substantially retrofit the power distribution system in a building is useful and is depicted hereafter.

SUMMARY

To provide DC power in a building with minimal change to the existing AC power system, one approach is to convert the existing AC power panel into a persistent DC power panel and to use the existing AC power distribution circuits for the DC power distribution.

One important requirement of a DC power panel is that it must be able to use regenerated DC energy effectively. The regenerated energy would be a main power to the persistent DC power panel. A backup solution must be available to continuously provide DC power consistently when the regenerated energy is unavailable. The most cost-effective and reliable backup solution is still to use AC power. Thus, the AC power would be also input to a persistent DC power panel as an auxiliary power.

DC power distribution shall be the main technique for an entire building in a DC ubiquitous environment. A technique without doing a substantial retrofit in the existing power distribution system but capable of converting the entire power system in a building from AC to DC and also capable of providing a persistent DC power is to replace the AC main switch in an AC power panel with a persistent DC power switch.

An AC main switch has connection to the two phase-lines from AC power inputs. It also has two output connections to the power rails in power panel, which interfaces with circuit breakers installed in AC power panel. A persistent power switch would keep the same connections and structure, except with additional input connections to external DC power, ground and neutral from the AC power. The persistent power switch retains the same AC main switch in power panel and incorporates a new persistent DC power module in the switch to facilitate the generation and the re-direction of DC power for output from the power panel. The additional input connections to the persistent power switch are actually input to the persistent DC power module.

The persistent DC power module may be removeable and replaced with a different one of different DC power range. The output of a persistent DC power module may be adjustable to output different DC voltages as well. The persistent DC power module may be included in the persistent power switch to convert a power panel into a persistent DC power panel. Or, it may be removed from the persistent power switch to convert it back to an AC power panel. The persistent DC power module may be an integrated unit embedded in the persistent power switch, or it may be an add-on unit that is pluggable or can be coupled to an AC power switch with power cable connections.

The persistent DC power module may be an integrated-circuits (IC), or a multi-chip module (MCP), or assembled with a set of discrete devices on a substrate or printed circuit board. The persistent DC power module includes a control to monitor the availability of external DC power input, and bases on the availability of DC external power to control the enabling of AC power input to be converted into DC power by an embedded AC-to-DC converter (ADC). The persistent DC power module also includes control based on the availability of external DC power source to select either a regulated DC power from the external DC power source or a converted DC power generated from ADC for output.

A persistent power switch is highly flexible to provide AC power or DC power for an entire building with a simple connection change in the persistent power switch. It can utilize the exiting AC power panel for providing up to two persistent DC powers. It may provide more persistent DC powers for use if the number of internal power rails in a DC power panel is increased. A DC power panel may also be constructed with a new grounding connection method to simplify the wirings in ground output for the DC power distribution circuits. The configuration of the persistent power switch and the variations in the construction of power panel are depicted hereafter.

DETAIL DESCRIPTIONS

Having persistent DC power prevailed in the entire building and being able to effectively utilize the regenerated DC energy will be a norm in a DC ubiquitous environment. Most household electronic products, such as TV, entertainment gadgets, microwave oven, communication gears, computer, laptops, light illumination, and hand-held devices, etc., that include solid-state electronics would eventually be designed and manufactured to use DC power as input. To eliminate most portable power adaptors and the AC-DC power supply inside household electronic products could reduce energy waste and minimize tremendous electronic components used in power conversion products.

A DC ubiquitous environment can be readily achieved by modifying the existing AC power panel in a physical infrastructure and leveraging the existing AC power distribution circuits for DC power delivery. Understanding the configuration of an AC power panel is helpful to perceive the embodiment of the persistent power switch and the technique adopted for power panel conversion.

Figure 1:
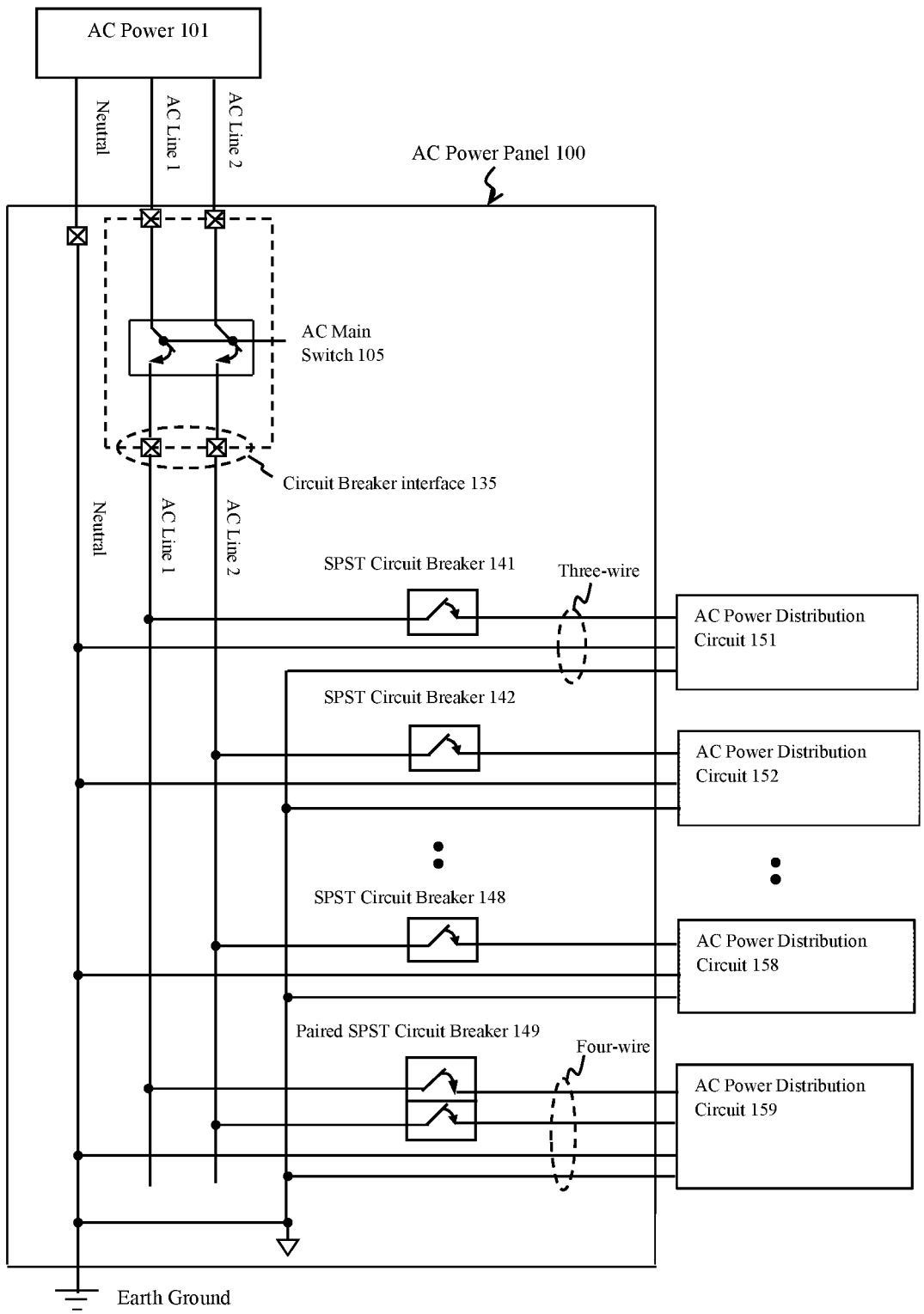
FIG. 1 shows an exemplary configuration of an AC power panel.

FIG. 1 shows the configuration of an exemplary AC power panel 100. The AC power 101 input to AC main switch 105 is directly connected to the circuit breaker interface 135 to power a multitude of AC circuit breakers 141, 142, . . . , 149 for their respective AC power distribution circuits 151, 152, . . . , 159. The AC circuit breaker is mainly a single-pole, single-throw (SPST) switch installed in AC power panel 100. The SPST circuit breaker switches on/off one of the phase-lines being input from the AC power 101. A phase-line and neutral in the AC power 101 provides a 120V AC power for a three-wire AC power distribution circuit 151, 152, . . . , or 158. When higher power is required, two SPST AC circuit breakers may be grouped together, such as the paired SPST circuit breaker 149, whose respective input is connected to a different phase-line to provide 240V AC power output to a four-wire AC power distribution circuit 159.

Figure 2:
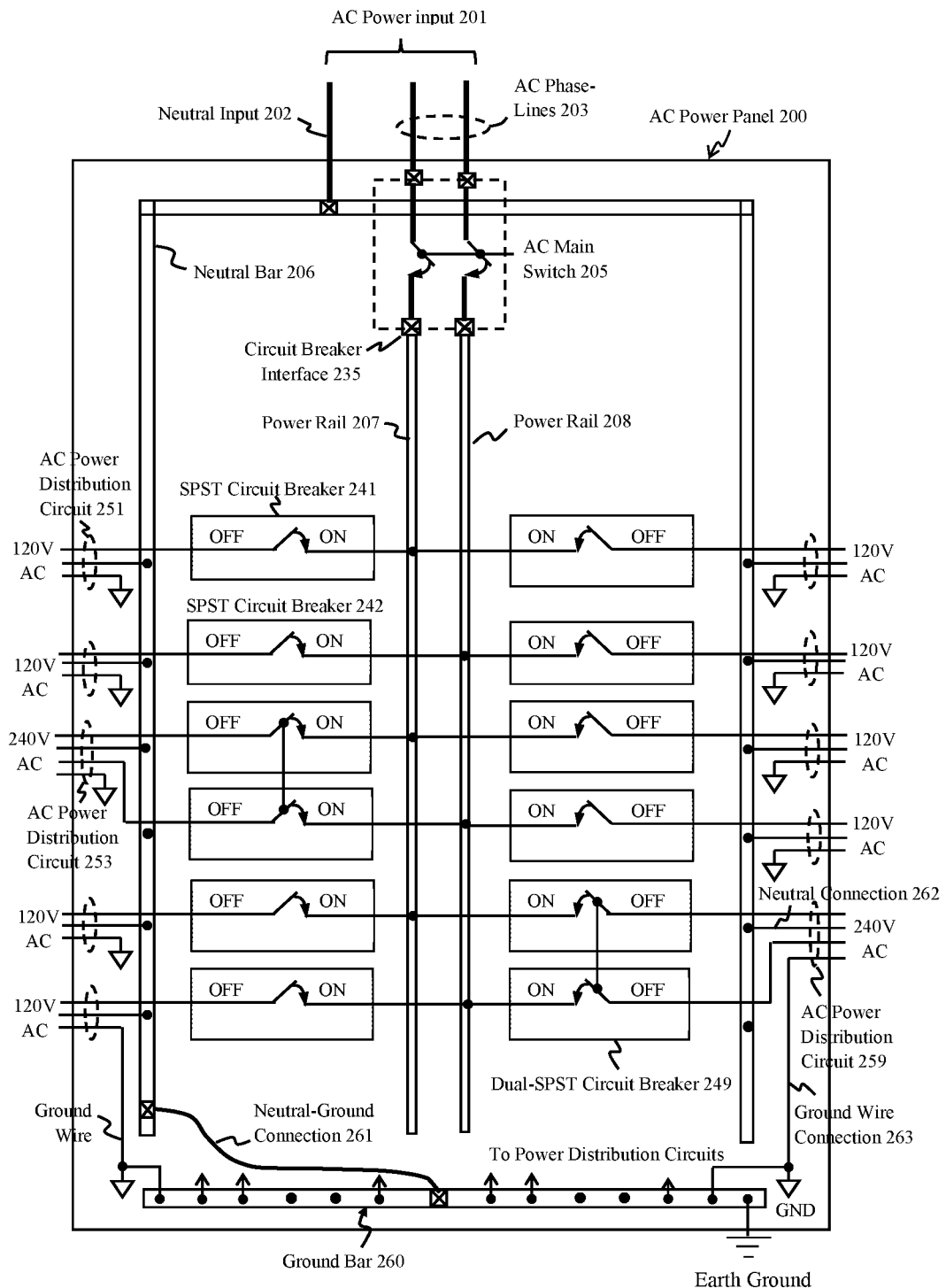
FIG. 2 shows an exemplary physical configuration of an AC power panel.

FIG. 2 illustrates a physical configuration of an AC power panel corresponding to the power panel shown in FIG. 1. The power panel 200 takes AC power input 201, which comprises a neutral input 202 connected to a neutral bar 206 around the power panel 200 and two AC phase-lines 202 being input to a double-pole, single throw (DPST) AC main switch 205, where the output of the AC main switch 205 is connected to two power rails 207, 208 embedded in the power panel 200. Each circuit breaker 241, . . . , 249 is coupled to one of the power rails 207, 208 for output to AC power distribution circuits 251, . . . , 259.

For 120V AC power distribution, it includes three power interconnects, such as the AC power distribution circuit 251, which includes a phase line connected to the output of a SPST circuit breaker, a neutral wire connected to neutral bar 206, and a ground wire connected to ground bar 260, where the ground bar 260 is tied to earth ground and is also connected to the neutral bar 206.

For 240V AC power distribution, such as the AC power distribution circuit 253 or 259, there are four power interconnects, which include a phase line output being connected to the output of a SPST circuit breaker, a neutral wire output being connected to neutral bar 206, a second phase-line output being connected to the other output of a paired SPST circuit breaker 249, plus a ground wire output connected to the ground bar 260.

Figure 3:
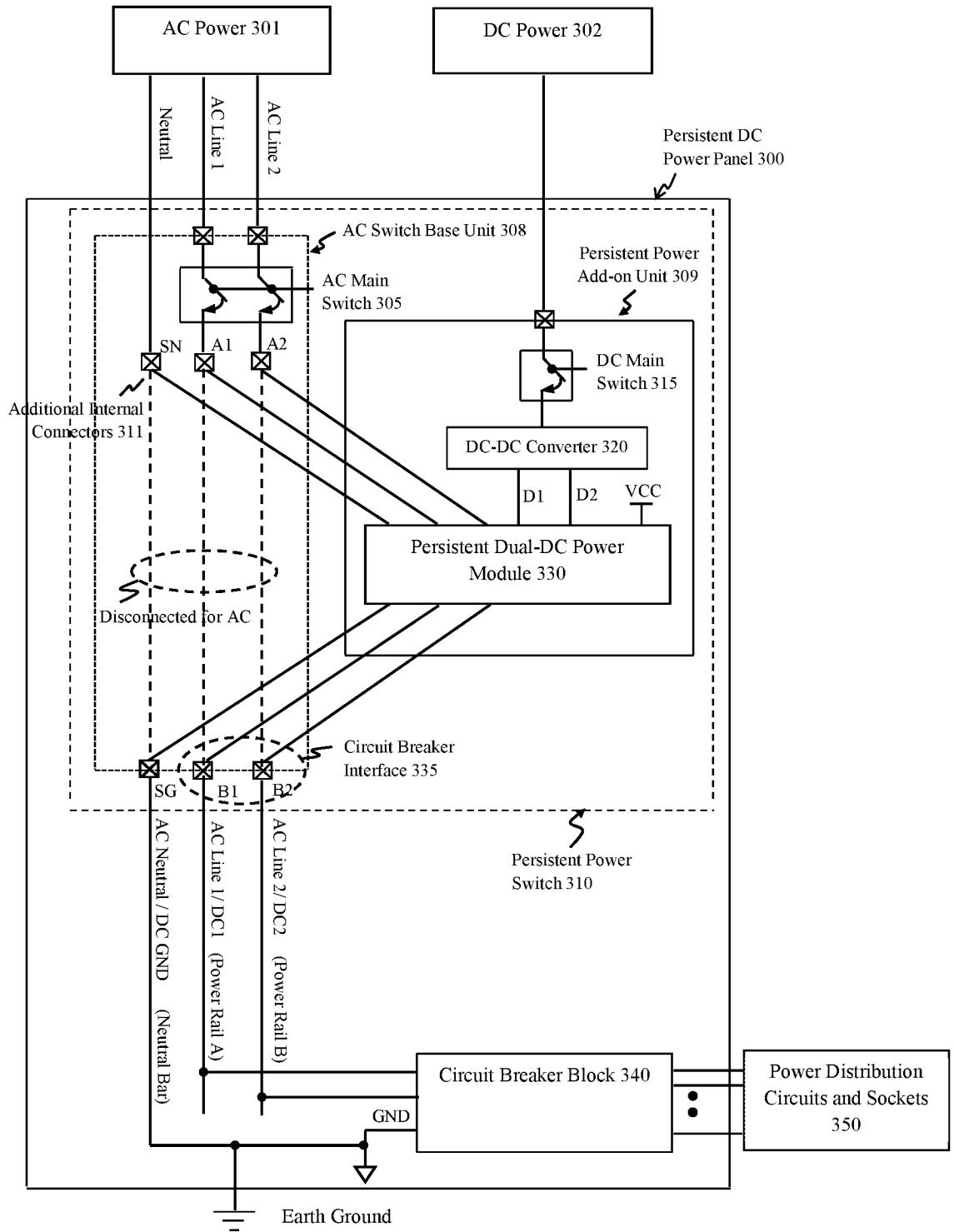
FIG. 3 shows an exemplary configuration of a converted persistent DC power panel.

FIG. 3 shows an exemplary configuration of a converted persistent DC power panel 300, where the AC main switch in an AC power panel is reconfigured to become a persistent power switch 310, which effectively converts an AC power panel into a persistent DC power panel. Besides the original connections to the AC main switch in an AC power panel, the persistent power switch 310 only requires additional connections to the external DC power 302 and ground, which makes the power panel conversion simpler and straightforward.

The persistent power switch 310 mainly includes two components, i.e. an AC main switch 305 and a persistent DC power module 330. A persistent dual-DC power module 330 is a preferred installation, as the two outputs of a persistent dual-DC power module 330 can be connected to two embedded power rails in an AC power panel seamlessly. The two outputs of the persistent dual-DC power module 330 may include a high DC voltage and a low DC voltage to drive a DC power distribution circuit so that user can either extract a high DC voltage or a low DC voltage on the same power distribution circuit for applications requiring either a high DC voltage or a low DC voltage.

The two components may be integrated into a single unit for installing into an AC main switch slot in power panel. The replacement of the AC main switch by the integrated persistent power switch automatically disconnects the AC power input to the power rails in power panel. Instead, the AC power input is configured as input to the persistent power switch 310, and the output of the persistent power switch 310 is configured to be coupled to the power rails in power panel 300.

However, it is useful to support the replacement of a persistent DC power module 330 in persistent power switch 310 without a need to remove the entire integrated persistent power switch 310 from a power panel in case the persistent DC module 330 becomes faulty or there is a need for upgrade.

In an embodiment, a solution to support such a function is to partition a persistent power switch into two units, i.e. a fixed base unit 308 and a removable unit 309. The fixed base unit 308 includes the AC main switch installed in an AC power panel, plus including a few addition connectors in the AC switch base unit 308, i.e. SN, A1, A2, SG, B1 and B2, where the SN is a connection point or connector pluggable or screwable connector to make contact with neutral input, A1 and A2 are connectors to the output of AC main switch 305, B1 and B2 are connectors at the circuit breaker interface 335 for connecting to the embedded power rails in an AC power panel, and SG is a connector to neutral, which functions as a neutral connection in AC power panel and a ground connection in DC power panel.

In a DC power panel, neutral is no longer required in a DC power distribution circuit. However, its connection to earth ground becomes a ground connection to the persistent DC power module 330. The persistent DC power module is alternatively referred to as a 'DC power module', or 'DC module' hereafter.

The removable unit, i.e. the persistent power add-on unit 309, mainly includes the persistent DC power module 330. Some auxiliary devices, such as the DC-DC converter 320 to generate multiple-DC voltages for input to the persistent dual-DC power module 330, and the DC main switch 315 to control the external DC input may be included or excluded from the persistent power add-on unit 309, as they may be more suitable to install in other convenient locations in some cases due to the compartment space constraint and/or the heat dissipation concerns.

The persistent power add-on unit 309 receiving external DC power 302 can be plugged onto the AC switch base unit 308 or use cable connection to have the power interface on the persistent power add-on unit 309 to be in firm contact with the connectors of the AC switch base unit 308, where the SN, A1, A2 are the AC power input to the persistent DC power module 330, the B2, B2 are connected to the two outputs of the persistent dual-DC power module 330, and the SG provides ground connection to the persistent DC power module 330. The three sets of wire connections between SN and SG, A1 and B1, and A2 and B2 in AC power panel will be disconnected when connecting the persistent power add-on unit 309 to the AC switch base unit 308.

By connecting the three sets of wirings in the AC switch base unit, the power panel is configured as an AC power panel. With a persistent power add-on unit 309 being installed to couple to the AC switch base unit 308, the power panel is configured as a DC power panel. The interchange between the AC power panel and DC power panel are simple and straightforward. During the power panel conversion, the AC main switch 305 can be switched off to disconnect AC power without electric shock concern.

The portability of the persistent power add-on unit 309 enables the unit to be implement as a stand-alone unit to place outside the power panel and use power cable to connect the add-on unit 309 to the connectors at AC switch base unit 308 to attain the full function of a persistent power switch 310.

A device operation voltage VCC for use by control circuits in the DC power module 330 may be generated locally in the persistent power add-on unit 309.

Figure 4:
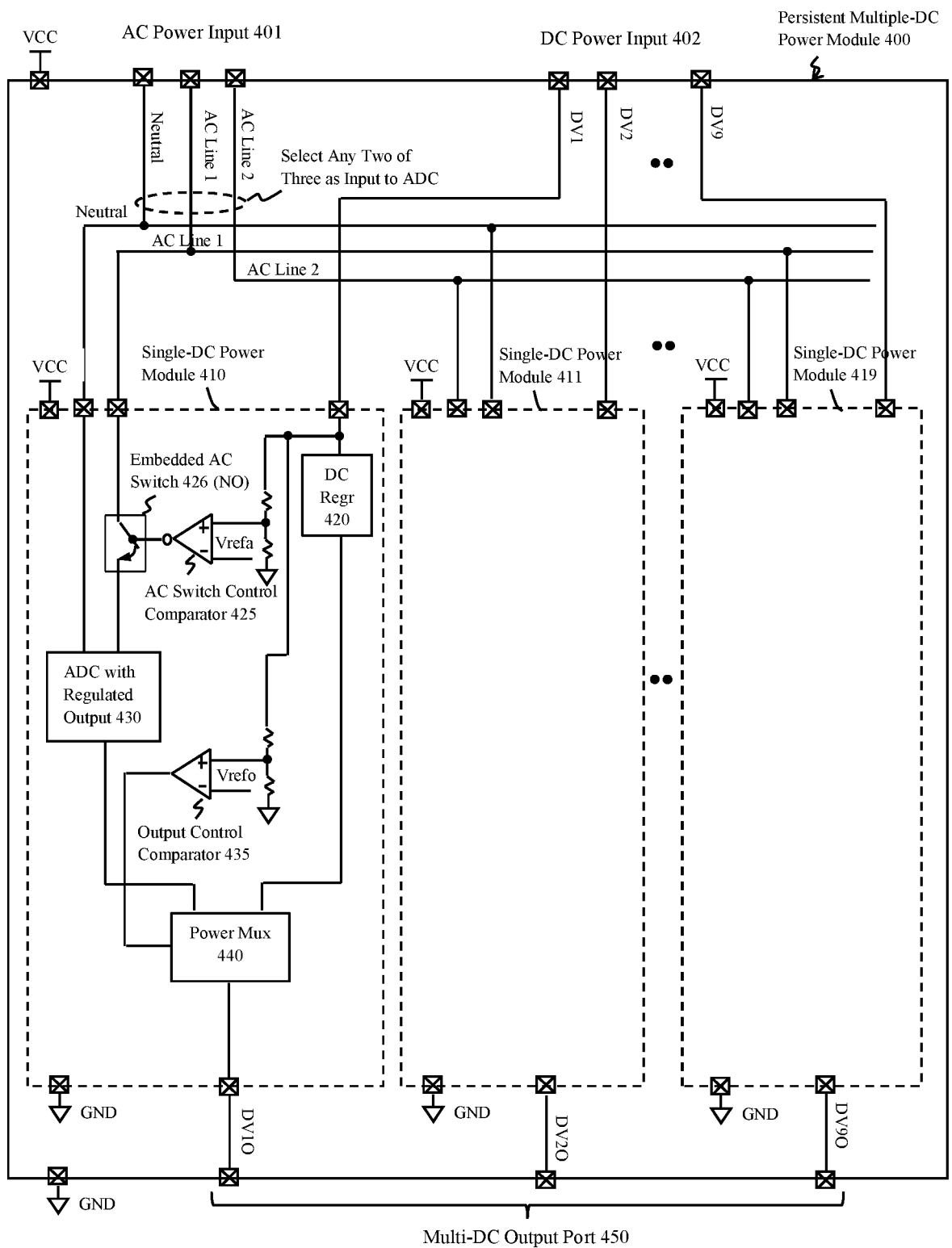
FIG. 4 shows an exemplary configuration of a persistent multi-DC power module.

FIG. 4 shows an exemplary configuration of a persistent multi-DC power module 400, where the persistent multi-DC power module 400 includes one or more single-DC power modules 410, 411, . . . , 419. A persistent single-DC power module can be implemented with a set of discrete devices assembled on a substrate or a printed circuit board (PCB). It can also be implemented in a multi-chip package (MCP), or fabricated as one or more integrate-circuits to minimize device footprint and to improve reliability. A persistent multi-DC power module can be formed by grouping multiple single-DC modules, assemblies, or integrated circuits together.

In a single-DC power module 410 shown in FIG. 4, it includes a DC voltage regulator 420, which regulates the DC input DV1 to a regulated voltage required by a DC power distribution circuit. The DC input DV1 is attenuated to a voltage compatible with the device operation voltage VCC before input to two detection devices to monitor the DC power strength, where one is an AC switch control voltage comparator 425, namely an AC switch control comparator, and the other is an output switching control voltage comparator 435, namely an output control comparator. The attenuated input to the AC switch control comparator 425 will be compared with an AC switch control reference voltage Vrefa to control the switching of an embedded AC switch 426. The attenuated input to the output control comparator 435 will be compared with an output control reference voltage Vrefo to select the regulated DC voltage for output.

When the attenuated DC input to comparator 425 is higher than Vrefa, the normally-open (NO) embedded AC switch 426 will remain open. But as the DC power input becomes lower and the attenuated input of DV1 drops below Vrefa, then the inverted output of the AC switch control comparator 425 will become high to cause the normally-open embedded AC switch 426 to close in order for the AC power input 401 to power up an embedded AC-DC converter (ADC) 430.

The Vrefa is higher than Vrefo, so that the embedded AC switch 426 can be turned-on in advance to power up the embedded ADC 430 before the output control comparator 435 changes state to select the voltage of regulated ADC output 430 to the DC output port 450. The ADC output voltage 430 is regulated to be the same as the DC regulator 420 output voltage to ensure a constant DC voltage is output from the DC power module 410, regardless of which regulated voltage being output by the power mux 440.

The output control voltage comparator 435 controls the selection of either the regulated voltage from DC regulator 420 or the regulated voltage from ADC 430 for output. Default is to select the regulated output voltage from DC regulator 420. When the attenuated voltage of DV1 drops below Vrefo, the output control comparator 435 would change state to have the power mux 440 to select the ADC 430 regulated voltage to the output port 450. But as the attenuated voltage rises above Vrefo, the output of output control comparator 435 will change its output state again and the power mux 440 will change its output to select the regulated voltage from DC regulator 420 to the output port 450. If the attenuated DC input continues to rise higher than Vrefa, then the inverted output of AC control comparator 425 will flip to open the embedded AC switch 426 to cut off AC power input.

Any two of the three input wires in AC power 401 may be selected as AC input to ADC 430. In FIF. 4, neutral and AC phase line 1 provides 120V AC input to ADC 430, with the AC line 1 being switchable by the embedded AC switch 426. Both AC line 1 and AC line 2 can be input to ADC 430 when a stronger 240V AC power is required. The both AC lines will be switched under the control of AC switch control comparator 425. The DC-DC converter 320 shown in FIG. 3 may be included in the persistent multi-DC power module by taking an external DC power input to generate a multitude of DC powers DV1, DV2, DV9.

Figure 5:
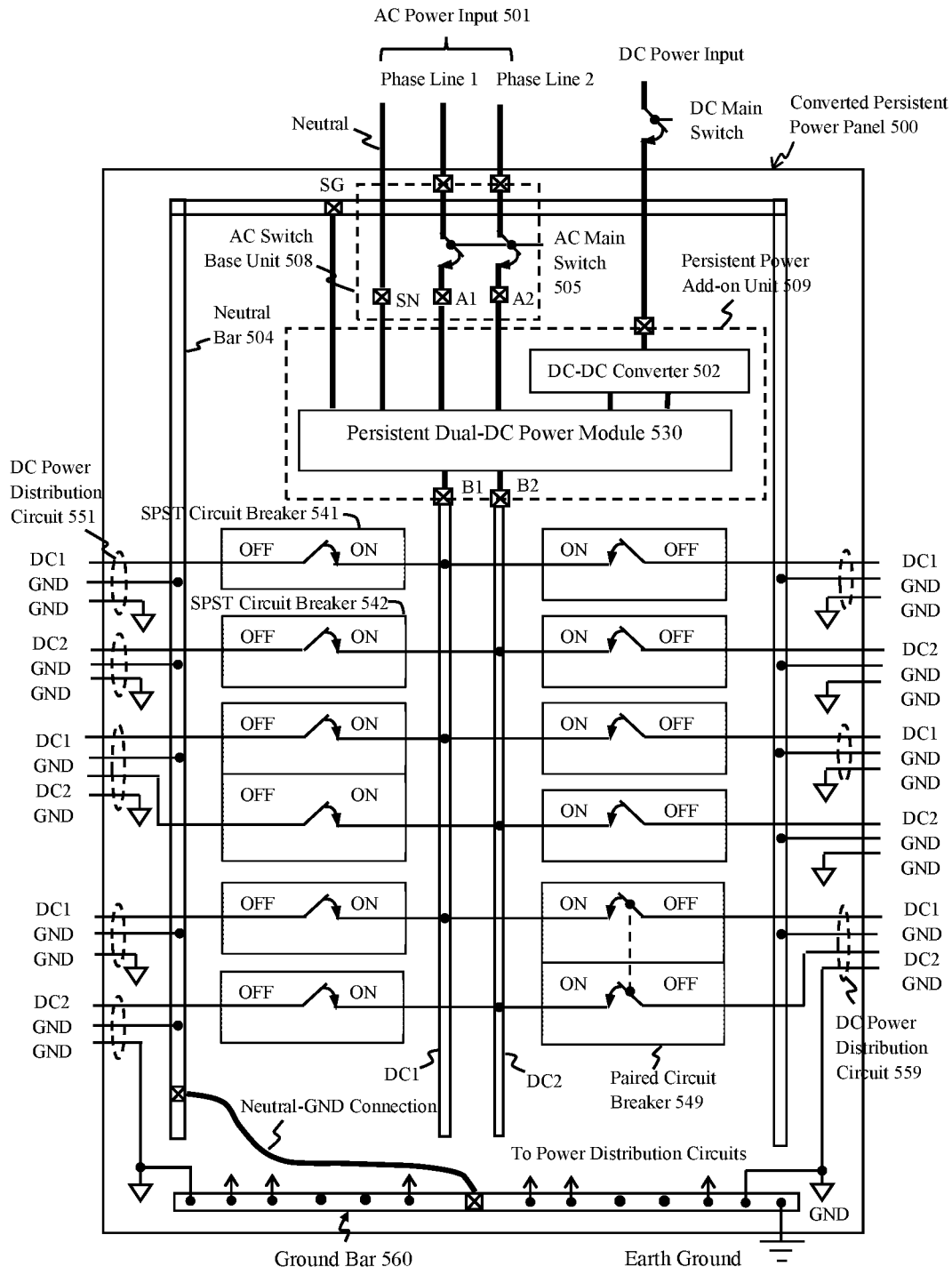
FIG. 5 illustrates an exemplary physical configuration of a converted persistent DC power panel with least change in the configuration of AC power panel.

FIG. 5 illustrates an exemplary physical configuration of a converted persistent dual-DC power panel, which has least configuration change from an AC power panel. The AC main switch 205 in the AC power panel 200 of FIG. 2 remains the same. A persistent power add-on unit 509 is coupled to the AC switch base unit 508 in the converted persistent DC power panel 500 at six connection points or connectors, i.e. SG, SN, A1, A2, B1, and B2, as shown in FIG. 5.

The neutral from AC power input 501 is not connected to the neutral bar 504, but is connected to connector SN for coupling to the persistent DC power module 530 in persistent power add-on unit 509. In a DC environment, AC power only functions as an auxiliary power supply. A ground connection is also connected to the power-add-on unit 509 at connector SG. Some SPST circuit breaker is usable for both AC and DC power distributions, then no more change in AC power panel is required and the panel conversion is complete, where each SPST circuit breaker in the converted power panel becomes to connect to a DC voltage, such as DC1 or DC2, on one of the two power rails.

The insertion of the persistent power add-on unit 509 to power panel 500 requires to disconnect neutral from the AC power input 501 to neutral bar 504. The neutral bar 504 becomes a ground connection due to its earth ground tie. Thus, a converted DC power distribution circuit 551, . . . , 559 will have two ground wires, such as the DC power distribution circuit 551 shows, due to the original neutral wire to bear ground connection after incorporating the add-on unit 509. Since phase line and neutral wire in a power distribution circuit use different color, user will be able to differentiate which power being on which wire in a DC power distribution circuit. More ground connection helps to minimize the voltage variation in a DC circuit.

Figure 6:
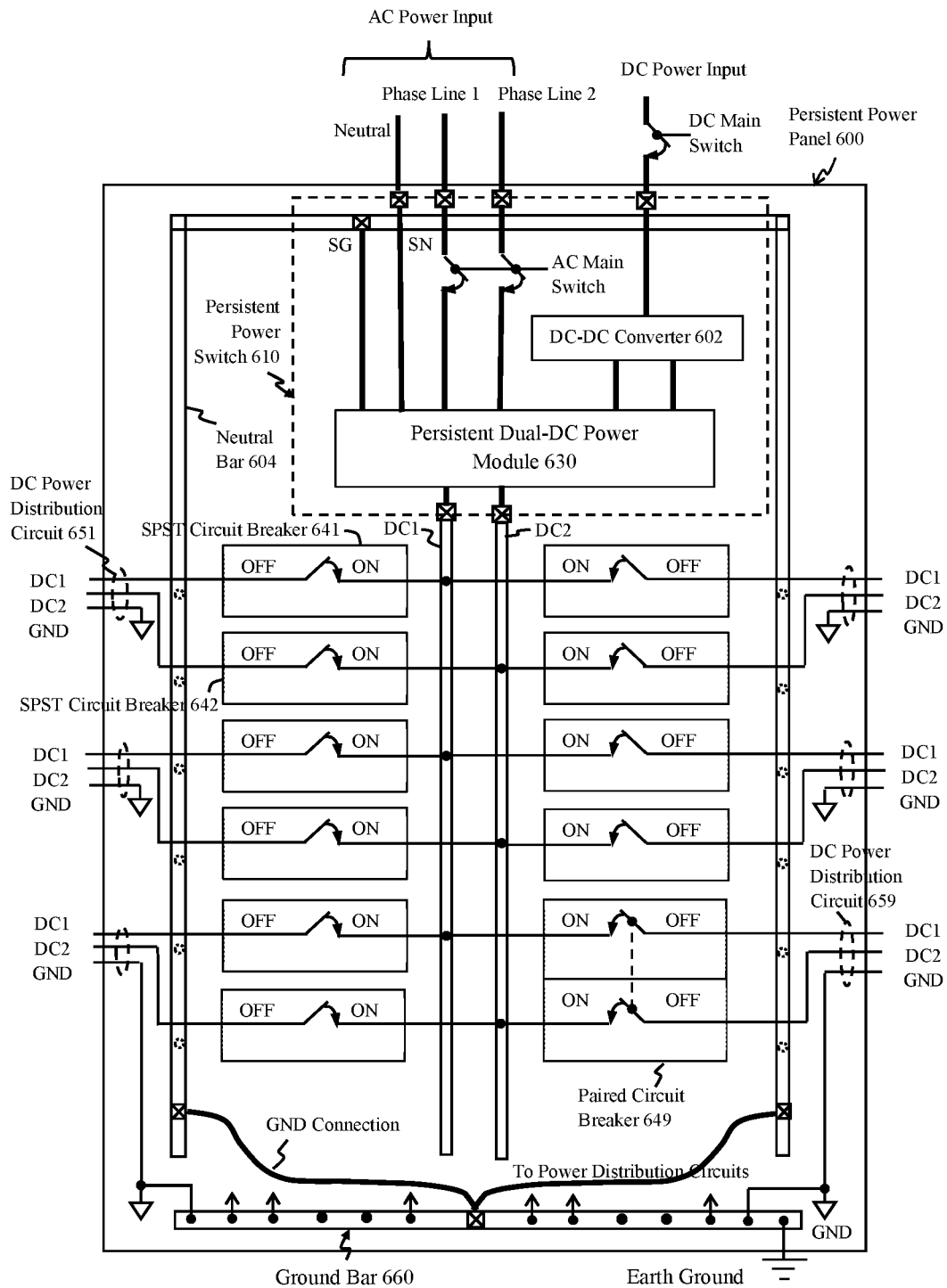
FIG. 6 illustrates another physical configuration of an AC panel converted persistent dual-DC power panel.

FIG. 6 illustrates another exemplary physical configuration of a converted persistent dual-DC power panel 600. The only difference in this example is the output of two STSP circuit breakers are grouped together to provide dual DC voltages for a DC power distribution circuit. For example, the output DC1, DC2 from two neighboring SPST circuit breakers 641, 642 are connected to two hot wires in original AC power distribution circuit to provide dual-DC powers for the DC power distribution circuit 651. This example requires re-wiring to connect a neighboring SPST circuit breaker output to the neutral wire of a dual-DC power distribution circuit 651. This conversion re-uses the STSP circuit breakers in an exemplary AC power panel for dual-DC power delivery, such as, the DC power distribution circuit 651.

Figure 7:
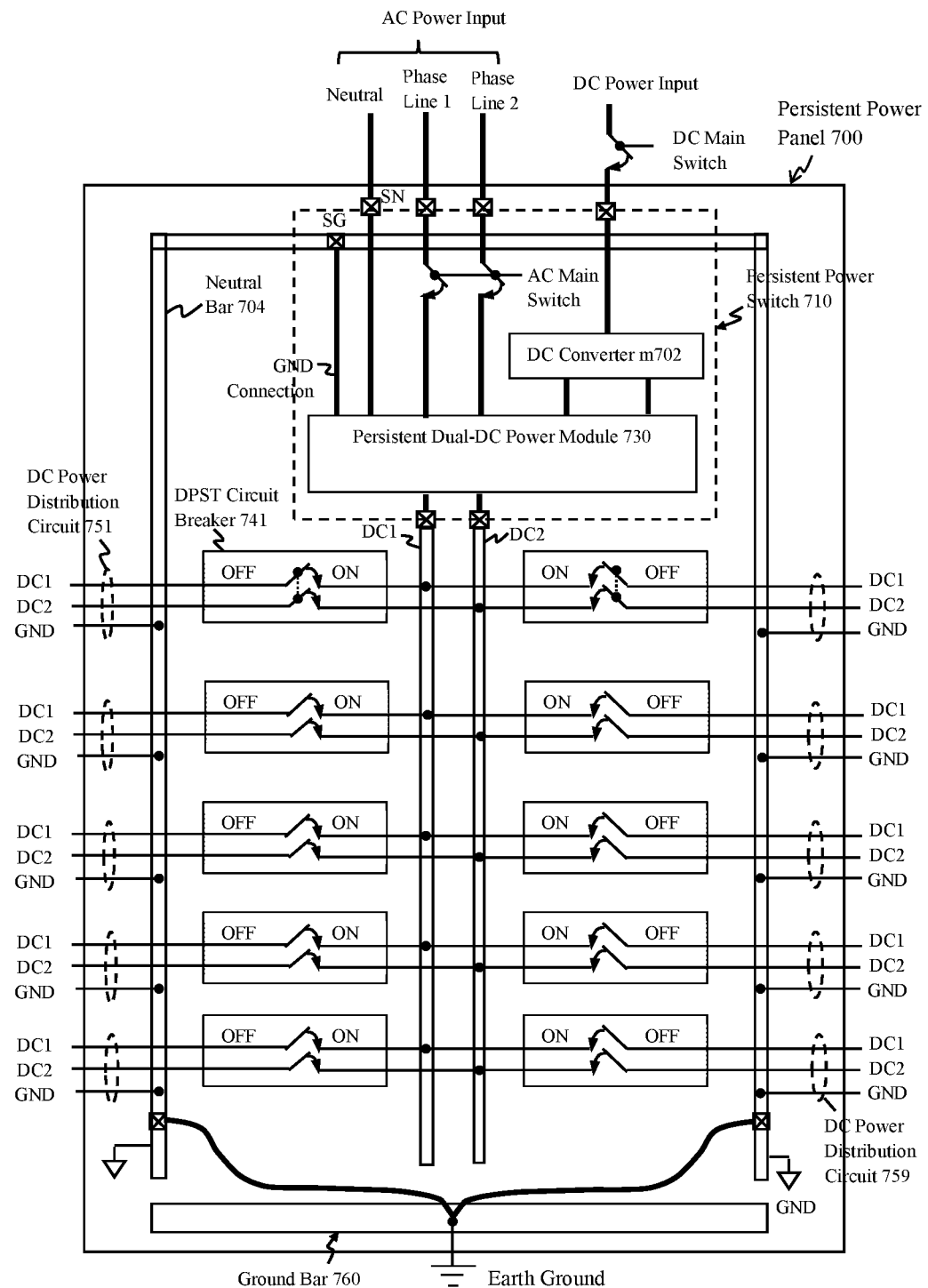
FIG. 7 illustrates a new exemplary physical configuration of a persistent dual-DC power panel.

FIG. 7 illustrates a new exemplary physical configuration of a converted persistent dual-DC power panel. A double-pole, single-throw (DPST) circuit breaker is selected to replace a pair of SPST circuit breakers shown in FIG. 6 for dual DC voltage delivery. For example, the DPST circuit breaker 741 is to break two DC powers DC1, DC2 from two power rails to the DC power distribution circuit 751.

Each DPST circuit breaker may occupy a circuit breaker slot similar to a SPST circuit breaker. The two poles of a DPST circuit breaker can be switched independently or switched simultaneously, depending upon the configuration of the circuit breaker.

In DC power panel 700, the neutral bar 704 and ground bar 760 are tied together with ground bar also tied to earth ground, same as an AC power panel. In an embodiment, the ground wire in a DC power distribution circuit is connected to the neutral bar of original AC power panel in a DC power panel. This substantially simplifies the ground wire connection for the DC power distribution circuits connected to the power panel 700. There is a shorter direct ground wire connection to a DC power distribution circuit from the DC power panel.

Regardless of either STSP or DPST circuit breaker being installed in DC power panel, for power panel conversion, such as the DC power distribution circuit 651 in FIG. 6 or the DC power distribution circuit 751 in FIG. 7, the original ground wire in the DC power distribution circuit can be re-connected to the neutral bar, whereas the neutral wire can be re-connected to a different DC output from a different SPST circuit breaker or from other output of a DPST circuit breaker.

The neutral bar 704 and ground bar 760 may be connected and constructed as a single conduction bar around the edge of a DC power panel. But, a DC power panel in such a configuration may not be converted to an AC power panel as there is no neutral connection for an AC power distribution circuit.

Figure 8:
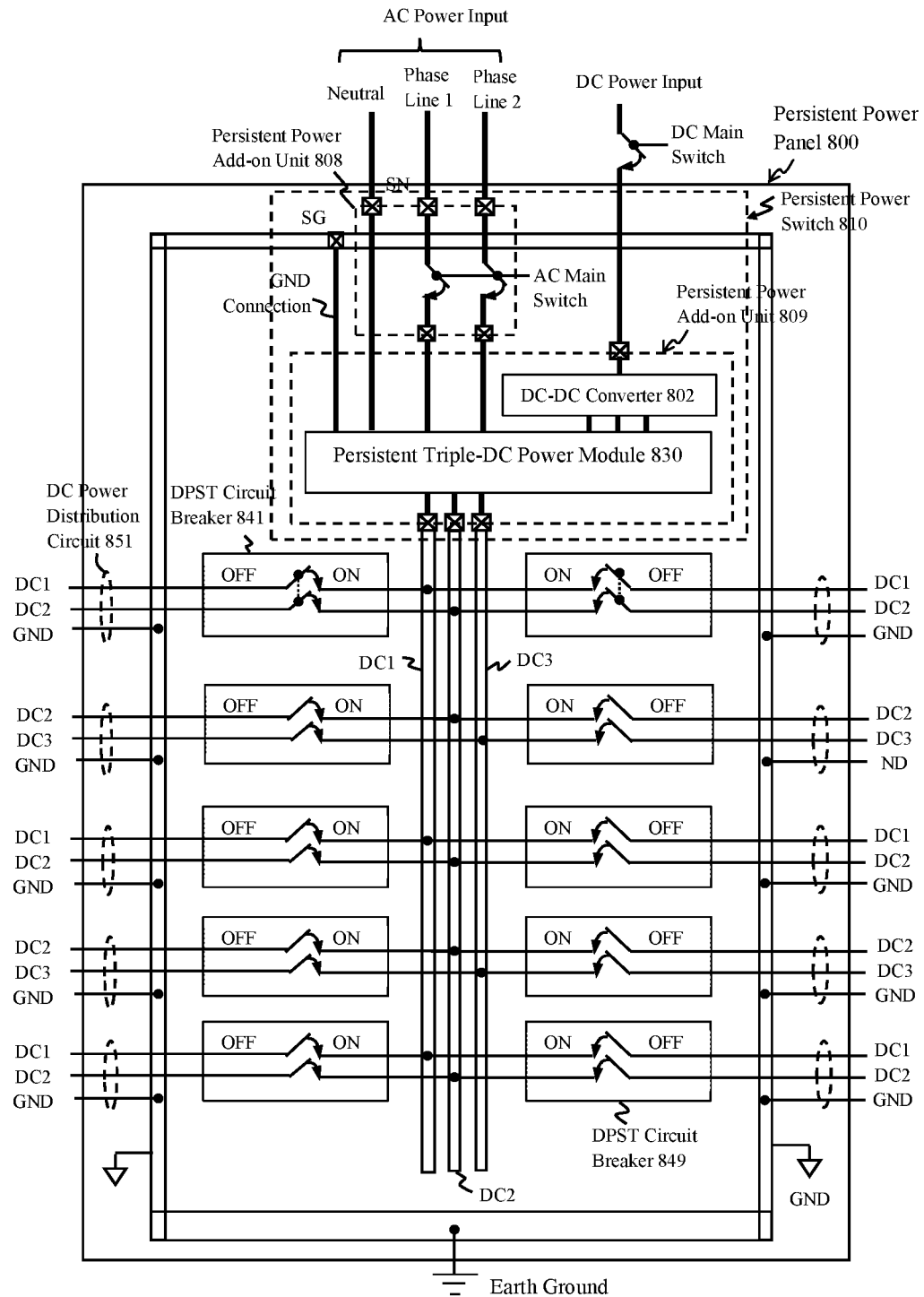
FIG. 8 illustrates an exemplary physical configuration of a persistent triple-DC power panel.

FIG. 8 shows the expandability of a DC power panel to distribute more DC powers by using an example of persistent triple-DC power panel 800, where an integrated persistent power switch 810, or a removable persistent power add-on unit 809 being coupled to an AC switch base unit 808, is incorporated in the persistent power panel 800. Three DC powers are output from the persistent triple-DC power module 830 in the persistent power switch 810. The three DC outputs from the persistent power switch 810 are connected to three power rails embedded in the DC power panel 800. A DPST circuit breaker 841, . . . , or 849 has the choice to connect to any two of the three DC outputs from the persistent power switch 810 for a power distribution circuit, such as the DC power distribution circuit 851. In the example, DC2 is arbitrarily selected as a common DC voltage for distributing to all DC power distribution circuits connected to the power panel 800.

Figure 9:
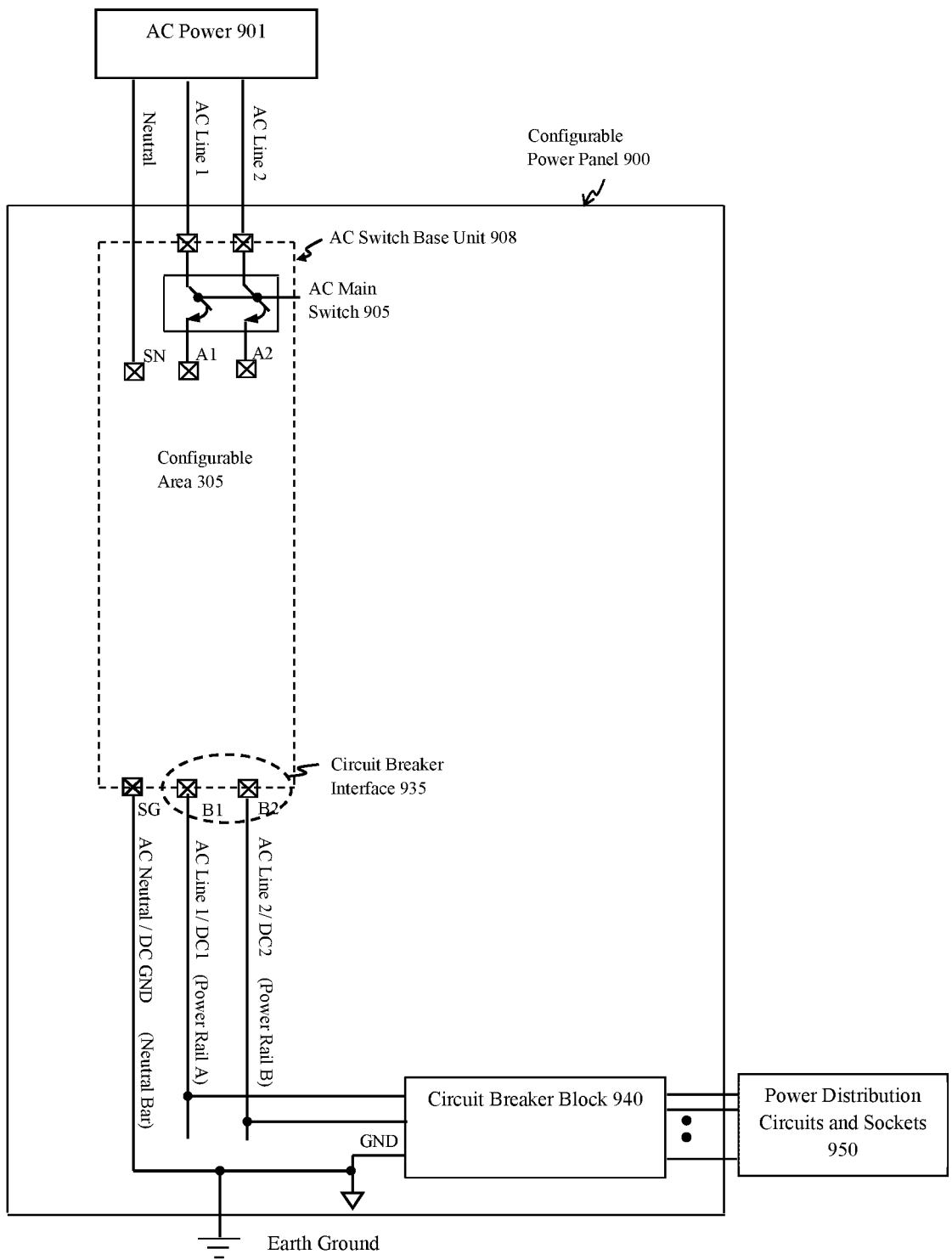
FIG. 9 illustrates an exemplary frame structure of a configurable power panel.

In an embodiment, FIG. 9 shows an exemplary frame structure of a configurable power panel 900. The configurable power panel includes an AC switch base unit 908, which houses an AC main switch 905 to connect to AC power 901 at its two phase-lines. The AC switch base unit 980 may be designed as a receptacle to allow insertion or connection of power wires or add-on power unit. The AC switch base unit 908 can be pre-mounted on the configurable power panel 900.

There are several embedded connectors or terminals in the configurable power panel 900, which include the SN connector being connected to neutral from AC power 901, the A1 and A2 connectors for connecting to the output of AC main switch 905, the B1 and B2 connectors at the circuit breaker interface 935 for connecting to the power rails in power panel, and a ground connector SG. The number of connectors at the circuit breaker interface 935 is changeable, depending upon the number of DC voltages to be output from the configurable power panel 900. The number can be as few as only one, or can be expanded to a number required by applications. The connector SG has dual functions. It functions as a neutral connection in an AC power panel and as a ground connection in a DC power panel.

The configurable power panel 900 can be configured as an AC power panel by connecting wires between SN and SG terminals, A1 and B1 terminals, and A2 and B2 terminals. Terminal is alternatively used as connector in the description. The persistent power switch is a persistent AC switch in this case.

The configurable power panel 900 can be configured as a persistent DC power panel by coupling or connecting a persistent power add-on unit to the AC switch base unit 908. The persistent power add-on unit may be assembled or manufactured as an external stand-alone device for coupling to the AC switch base unit 908 by using power cables to connect the two units into a persistent DC power switch.

A removable power add-on unit enables the selection of proper DC voltage for output to the DC power distribution circuits. The output voltages from the configurable power panel may be also adjustable by adjusting the regulator reference voltage in a single-DC power module included in the persistent power switch.

I claim:

1. A power panel comprising a configurable compartment, the configurable compartment comprising an AC power input section and an output section, wherein
   the AC power input section is coupled to a neutral line of an AC power received by the power panel and to two outputs of an AC switch disposed in the power panel, wherein inputs of the AC switch are coupled to two phase-lines of the AC power; and
   the compartment output section comprises at least two power connectors and a ground connector coupled to an earth ground; wherein
   when the power panel is configured as an AC power panel, the two outputs of the AC switch are wired to the at least two power connectors, and the neutral line is wired to the ground connector; and
   when the power panel is configured as a DC power panel, the at least two power connectors are coupled to one or more persistent DC outputs supplied from a persistent DC power source coupled to the power panel, and the ground connector is coupled to a ground terminal of the persistent DC power source and shares a same connection as the neutral line in the AC power panel.

2. The apparatus of claim 1, wherein the persistent DC power source provides one or more external DC inputs to the compartment output section.

3. The power panel of claim 1, wherein the persistent DC power source is output by a persistent DC power module, comprising
   an AC input port receiving the AC power;
   a DC input port coupled to an external DC power supply;
   a DC output port for delivering the one or more persistent DC outputs;
   a ground connection; and
   a control circuit adapted to monitor the external DC power supply to enable a device selected from:
      a DC regulator adapted to regulate the external DC power supply into one or more regulated DC voltages for delivery to the DC output port when voltage of the external DC power supply is above a threshold voltage, and
      an embedded AC-to-DC converter (ADC) adapted to receive the AC power to generate one or more converted DC voltages for delivery to the DC output port when voltage of the external DC power supply is below the threshold voltage, wherein
      the one or more converted DC voltages are substantially at same voltages respectively as the one or more regulated DC voltages, and wherein the one or more regulated DC voltages and the one or more converted DC voltages are supplied as the one or more persistent DC outputs to the DC output port.

4. The apparatus of claim 3, wherein the AC power applied to the control circuit is enabled when the external DC power supply drops below a turn-on voltage higher than the threshold voltage, and wherein the AC power is disabled when the external DC power supply rises to the turn-on voltage.

5. The power panel of claim 3, wherein the persistent DC power module is a stand-alone module adapted to be coupled to the power panel with one or more power cables.

6. The power panel of claim 3, wherein the persistent DC power module is an add-on module adapted to be mounted on the power panel.

7. The power panel of claim 1, wherein the power panel comprises a plurality of circuit breakers coupled to the compartment output section, wherein
   when configured as the AC power panel, the plurality of circuit breakers are coupled to the two phase-lines and to the neutral line to provide the AC power to one or more AC power distribution circuits; and
   when configured as the DC power panel, the plurality of circuit breakers are coupled to the one or more persistent DC outputs and to the ground connector to provide persistent DC powers, wherein the ground connector operates as a current return path for one or more DC power distribution circuits.

8. The power panel of claim 1, wherein the power panel further comprises a ground conduction bar being positioned around the power panel and adapted for ground connection for one or more DC power distribution circuits.

9. A persistent DC power module comprising:
   an AC input port for coupling to an AC power;
   a DC input port for coupling to an external DC power supply;
   a DC output port for outputting one or more persistent DC outputs;
   a ground connection; and
   a control circuit adapted to deliver the one or more persistent DC outputs, wherein the control circuit comprises:
      a first comparator adapted to compare a voltage received from the external DC power supply with a first reference voltage;
      a second comparator adapted to compare the voltage received from the external DC power supply with a second reference voltage, wherein the second reference voltage is lower than the first reference voltage;
      a DC voltage regulator to regulate the external DC power supply into one or more regulated DC voltages for delivery to the DC output port as the one or more persistent DC outputs, when the voltage received from the external DC power supply adapted to be compared by the second comparator is above the second reference voltage; and
      an embedded AC-to-DC converter (ADC) adapted to receive the AC power to generate one or more converted DC voltages for delivery to the DC output port as the one or more persistent DC outputs, wherein
      the first comparator enables the input port of the AC power in advance to power the embedded ADC, and the second comparator selects:

either the one or more converted DC voltages as the one or more persistent DC outputs when the voltage received from the external DC power supply adapted to be compared by the second comparator is below the second reference voltage, and or the one or more regulated DC voltages as the one or more persistent DC outputs when the voltage received from the external DC power supply adapted to be compared by the second comparator becomes equal to or increases above the second reference voltage, wherein the one or more converted DC voltages are substantially at same voltages as the one or more regulated DC voltages respectively.

10. A method for configuring a power panel to convert between an AC power panel and a persistent DC power panel, the method comprising:

incorporating a configurable compartment in the power panel, the configurable compartment comprising an AC power input section and a compartment output section, wherein the compartment output section comprises at least two power connectors and a ground connector coupled to an earth ground;

coupling the AC power input section to a neutral line of an AC power received by the power panel and to two outputs of an AC switch disposed in the power panel, wherein inputs of the AC switch are coupled to two phase-lines of the AC power;

configuring the power panel as the AC power panel by:
wiring two outputs of the AC switch to at least two power connectors at the configurable compartment output section, and
wiring the neutral line to a ground connector at the configurable compartment output section; and configuring the power panel as the DC power panel by:
coupling the at least two power connectors disposed in the configurable compartment output section to one or more persistent DC outputs supplied from a persistent DC power module coupled to the power panel, and
coupling the ground connector to a ground connection of the persistent DC power module; and, selecting between:
regulating a DC voltage supplied by an external DC power supply to generate the one or more persistent DC outputs when the external DC power is higher than a threshold voltage, and
converting the AC power received from the AC power input section to generate the one or more persistent DC outputs, when the external DC power supply is lower than the threshold voltage.

11. The method of claim 10, further comprising:
coupling a plurality of circuit breakers disposed in the power panel to the configurable compartment, wherein
the plurality of circuit breakers are coupled to the two phase-lines and to the neutral line when the power panel is configured as the AC power panel; and
the plurality of circuit breakers are coupled to the one or more persistent DC outputs and to the ground connector to provide persistent DC powers, when the power panel is configured as the DC power panel.

12. The method of claim 10, further comprising:
turning on the AC power in advance when the external DC power supply drops below a turn-on voltage being higher than the threshold voltage; and
turning off the AC power when the external DC power supply rises to the turn-on voltage.

13. The method of claim 10, wherein the persistent DC power module is a stand-alone module adapted to be coupled to the power panel by one or more power cables.

14. The method of claim 10, wherein the persistent DC power module is an add-on module adapted to be mounted to the persistent DC power panel.

\* \* \* \* \*